(12) United States Patent
Makino (10) Patent No.: US 11,757,159 B2
(45) Date of Patent: Sep. 12, 2023

(54) CONDUCTIVE MODULE

(71) Applicant: Yazaki Corporation, Tokyo (JP)

(72) Inventor: Kimitoshi Makino, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 345 days.

(21) Appl. No.: 17/183,249

(22) Filed: Feb. 23, 2021

(65) Prior Publication Data

US 2021/0273305 A1    Sep. 2, 2021

(30) Foreign Application Priority Data

Mar. 2, 2020    (JP) .................................. 2020-034687

(51) Int. Cl.
| | |
|---|---|
| *H01M 10/00* | (2006.01) |
| *H01M 50/552* | (2021.01) |
| *H01M 50/519* | (2021.01) |
| *H01M 50/547* | (2021.01) |
| *H01M 50/298* | (2021.01) |
| *H01M 10/48* | (2006.01) |

(52) U.S. Cl.
CPC ....... *H01M 50/552* (2021.01); *H01M 10/482* (2013.01); *H01M 50/298* (2021.01); *H01M 50/519* (2021.01); *H01M 50/547* (2021.01)

(58) Field of Classification Search
CPC ............. H01M 50/552; H01M 10/482; H01M 50/298; H01M 50/519; H01M 50/547; H01M 50/503; H01M 50/569; Y02E 60/10
See application file for complete search history.

(56) References Cited

U.S. PATENT DOCUMENTS

| | | | | |
|---|---|---|---|---|
| 2019/0044197 | A1* | 2/2019 | Ota | ........................ H05K 1/028 |
| 2019/0081311 | A1* | 3/2019 | Zeng | .................... H01R 12/774 |
| 2019/0245185 | A1 | 8/2019 | Ishihara | |

FOREIGN PATENT DOCUMENTS

JP    2018-18612 A    2/2018

* cited by examiner

*Primary Examiner* — Nicholas P D'Aniello
(74) *Attorney, Agent, or Firm* — KENEALY VAIDYA LLP (57) ABSTRACT

The conductive module includes interterminal connection component groups for respective electrode terminal groups, and flexible wiring components for the respective interterminal connection component groups. Each of the flexible wiring components includes a transforming portion performing transformation into a temporary mounted form at the time when each of interterminal connection components is connected with electrode terminals and a formal mounted form after work of the connection. Each of the transforming portions is provided in part of the crossing portion on a subsidiary conductive portion side and/or in the subsidiary conductive portion, and displaces a portion between a main conductive portion side and the subsidiary conductive portion side between the temporary mounted form and the formal mounted form by the transformation.

13 Claims, 6 Drawing Sheets

CONDUCTIVE MODULE

CROSS-REFERENCE TO RELATED APPLICATION(S)

The present application claims priority to and incorporates by reference the entire contents of Japanese Patent Application No. 2020-034687 filed in Japan on Mar. 2, 2020.

BACKGROUND OF THE INVENTION

1. Field of the Invention

The present invention relates to a conductive module.

2. Description of the Related Art

In conventional art, vehicles (such as an electric car and a hybrid car) each including a rotary machine as a driving source are equipped with a battery module feeding power to the rotary machine, and a conductive module electrically connecting a plurality of battery cells forming the battery module to an electrical connection target (for example, a battery monitoring unit to monitor the battery state of the battery cells). The conductive module is an array of a plurality of battery cells each including a positive electrode terminal and a negative electrode terminal, and includes two lines of terminal groups in each of which a plurality of electrode terminals are arranged in series. The conductive module includes, for example, a flexible wiring component disposed between the individual electrode terminal groups and formed in a flat shape with flexibility. The flexible wiring component includes a plurality of voltage detection lines each having flexibility and electrically connecting respective electrode terminals of the two electrode terminal groups with the electric connection target, and an insulating member formed in a flat shape with flexibility and containing the voltage detection lines. A conductive module having such a structure is disclosed in, for example, Japanese Patent Application Laid-open No. 2018-18612.

In the conductive module of this type, because the flexible wiring component covers an area between the electrode terminal groups on the battery module, the flexible wiring component has a large occupation area on the battery module. In such a flexible wiring component, for example, increase of the interval between the electrode terminal groups due to increase in capacity of the battery cells results in increase in a useless area in the insulating member.

SUMMARY OF THE INVENTION

For this reason, an object of the present invention is to provide a miniaturized conductive module.

In order to solve the above mentioned problem and achieve the object, a conductive module according to one aspect of the present invention includes interterminal connection component groups attached to a battery module and each provided with a plurality of interterminal connection components, the battery module being an array of a plurality of battery cells each including a positive electrode terminal and a negative electrode terminal, the battery module including two lines of electrode terminal groups in each of which the electrode terminals are arranged in series, the interterminal connection components being provided for each of the electrode terminal groups and electrically connecting the electrode terminals; and a flexible wiring component provided for each of the two interterminal connection component groups, and including a plurality of voltage detection lines arranged in parallel and measuring an interterminal potential between the electrode terminals, wherein the flexible wiring component includes a transforming portion enabling transformation into a temporary mounted form and a formal mounted form, the temporary mounted form is used when each of the interterminal connection components serving as a connection target is physically and electrically connected with the electrode terminals, and the formal mounted form is used after work of the connecting, each of the voltage detection lines includes a main conductive portion and a subsidiary conductive portion, the main conductive portion includes an extending portion extending in an array direction of the battery cells and electrically connected at one end with an electrical connection target and a crossing portion extending from the other end of the extending portion in a crossing direction crossing the array direction, the subsidiary conductive portion extends from one end of the crossing portion in an extending direction of the crossing portion and electrically connected at one end with the interterminal connection component serving as the connection target, the main conductive portions and an insulating portion covering the main conductive portions in the flexible wiring component are formed in a size capable of covering at least part of a corresponding one of the interterminal connection component groups serving as the connection target together with the electrode terminals in the formal mounted form, and the transforming portion is provided in part of the crossing portion on the subsidiary conductive portion side and/or in the subsidiary conductive portion, and displacing a portion between a main conductive portion side and the subsidiary conductive portion side between the temporary mounted form and the formal mounted form by the transformation.

In order to achieve the object, a conductive module according to another aspect of the present invention includes a flexible wiring component provided for each of interterminal connection component groups and including a plurality of voltage detection lines, the interterminal connection component groups each provided with a plurality of interterminal connection components provided for each of electrode terminal groups of a battery module and electrically connecting electrode terminals of the battery module, the battery module being an array of a plurality of battery cells each including a positive electrode terminal and a negative electrode terminal, the battery module including two lines of the electrode terminal groups in each of which the electrode terminals are arranged in series, the voltage detection lines being arranged in parallel and measuring an interterminal potential between the electrode terminals, wherein the flexible wiring component includes a transforming portion enabling transformation into a temporary mounted form and a formal mounted form, the temporary mounted form is used when each of the interterminal connection components serving as a connection target is physically and electrically connected with the electrode terminals, the formal mounted form is used after work of the connecting, each of the voltage detection lines includes a main conductive portion and a subsidiary conductive portion, the main conductive portion includes an extending portion extending in an array direction of the battery cells and electrically connected at one end with an electrical connection target and a crossing portion extending from the other end of the extending portion in a crossing direction crossing the array direction, the subsidiary conductive portion extends from one end of the crossing portion in an extending direction of the crossing portion and electrically connected at one end with the interterminal connection component serving as the connection target, the main conductive portions and an insulating portion covering the main conductive portions in the flexible wiring component are formed in a size capable of covering at least part of a corresponding one of the interterminal connection component groups serving as the connection target together with the electrode terminals in the formal mounted form, and the transforming portion is provided in part of the crossing portion on a subsidiary conductive portion side and/or in the subsidiary conductive portion, and displacing a portion between a main conductive portion side and the subsidiary conductive portion side between the temporary mounted form and the formal mounted form by the transformation.

According to still another aspect of the present invention, in the conductive module, it is preferable that the transforming portion is a bending transforming portion transforming the flexible wiring component into the temporary mounted form and the formal mounted form by bending transformation.

According to still another aspect of the present invention, in the conductive module, it is preferable that the flexible wiring component is a flexible printed circuit board.

According to still another aspect of the present invention, in the conductive module, it is preferable that a coupling flexible wiring component interposed between the one ends of the extending portions in the two flexible wiring components and the electrical connection target, and electrically connecting the two flexible wiring components with the electrical connection target, wherein the coupling flexible wiring component includes coupling voltage detection lines provided for the respective main conductive portions and electrically connecting the one ends of the extending portions with the electrical connection target, and a coupling insulating member containing all the coupling voltage detection lines, and includes following transforming portions provided for the respective flexible wiring components and enabling following transformation when the flexible wiring components are transformed between the temporary mounted form and the formal mounted form.

According to still another aspect of the present invention, in the conductive module, it is preferable that each of the coupling voltage detection lines includes a first coupling conductive portion and a second coupling conductive portion, the first coupling conductive portion extends in the opposed arrangement direction of the flexible wiring components in the formal mounted form and physically and electrically connected at one end with the corresponding one end of the extending portion, the second coupling conductive portion extends from the other end of the first coupling conductive portion in the array direction and electrically connected at one end with the electrical connection target, and each of the following transforming portions is provided for the first coupling conductive portions and a coupling insulating portion of the coupling insulating member covering the first coupling conductive portions.

According to still another aspect of the present invention, in the conductive module, it is preferable that the electrical connection target is a battery monitoring unit monitoring a battery state of each of the battery cells, and the coupling flexible wiring component is a double-sided flexible printed circuit board including two conductor pattern layers in each of which the coupling voltage detection lines are formed, and includes an insulating layer in which circuits of the coupling voltage detection lines connected with the battery monitoring unit are alternately distributed into one conductor pattern layer side and the other conductor pattern layer side.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

An embodiment of a conductive module according to the present invention will now be described hereinafter in detail with reference to drawings. The present invention is not limited to the embodiment.

Embodiment

An embodiment of the conductive module according to the present invention will now be described on the basis of FIG. 1 to FIG. 6.

Reference numeral 1 in FIG. 1 to FIG. 6 denotes a conductive module according to the present embodiment. The conductive module 1 is mounted on a battery module BM to form a battery pack BP together with the battery module BM (FIG. 2 to FIG. 6). The battery pack BP is mounted on, for example, a vehicle (such as an electric car and a hybrid car) including a rotary machine as a driving source, and used for feeding power or the like to the rotary machine.

Figure 2:
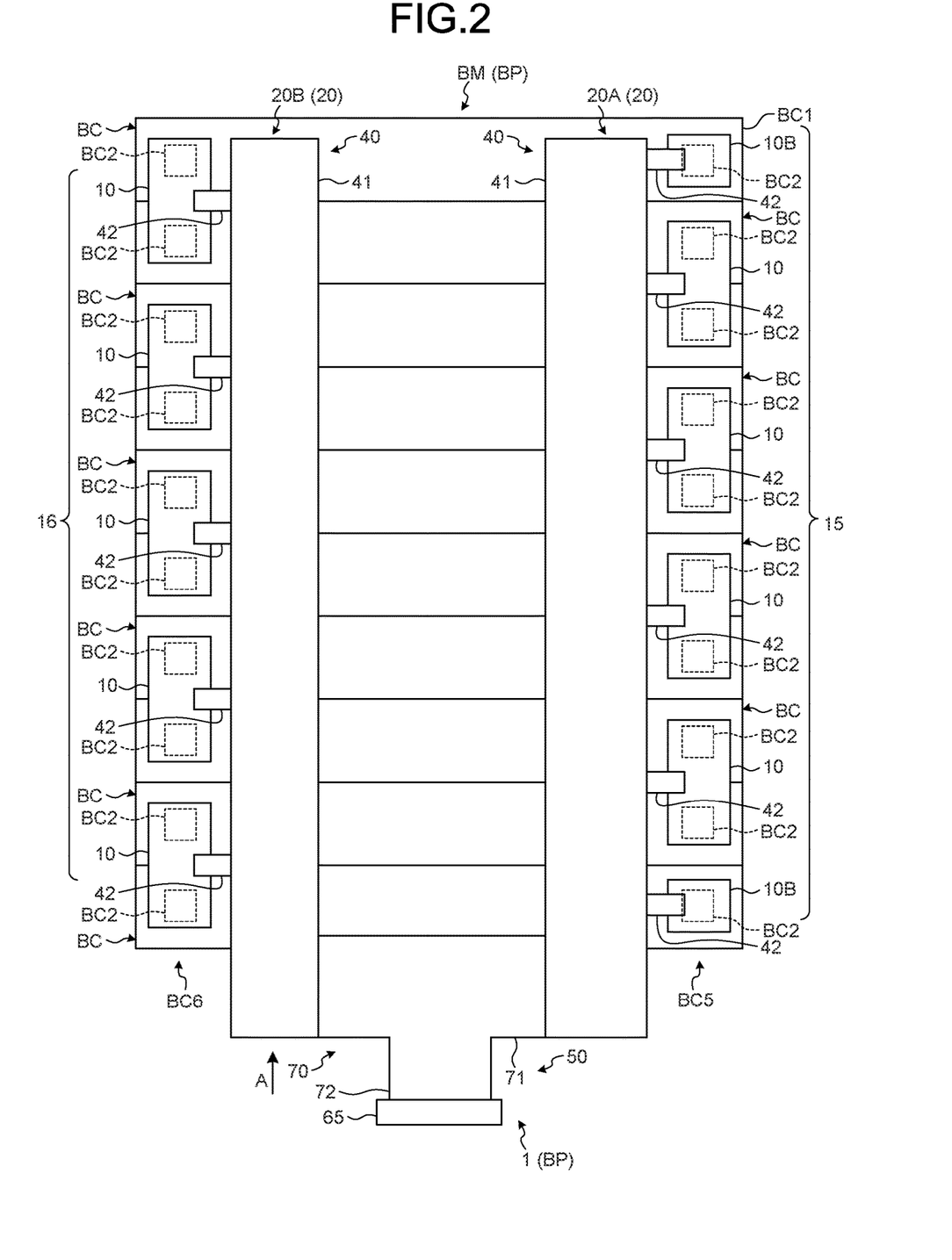
FIG. 2 is a plan view illustrating the conductive module in the temporary mounted form together with a battery module according to the embodiment.
Figure 3:
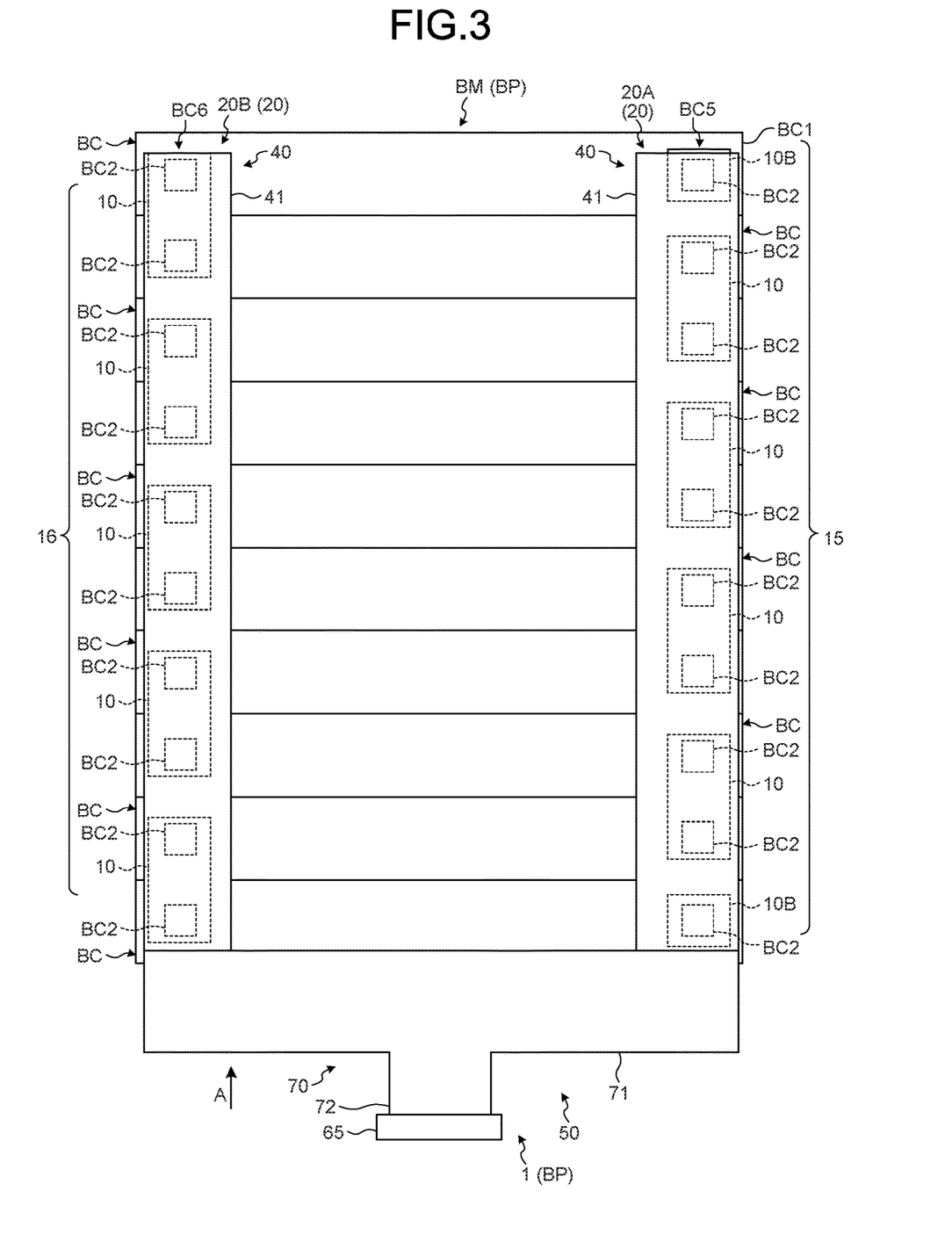
FIG. 3 is a plan view illustrating the conductive module in a formal mounted form together with the battery module according to the embodiment.

The battery module BM includes a plurality of battery cells BC (FIG. 2 and FIG. 3). Each of the battery cells BC includes a cell main member BC 1 and two electrode terminals BC2 (FIG. 2 and FIG. 4 to FIG. 6). Each of the electrode terminals BC2 is provided in a state of being exposed to the outside in any place of the cell main member BC1, one of the two electrode terminals serves as a positive electrode, and the other serves as a negative electrode. Each of the electrode terminals BC2 is, for example, a plate-shaped or a rectangular-parallelepiped-shaped electrode provided on an outer wall surface of the cell main member BC1, or a pillar-shaped electrode column formed to project from the outer wall surface of the cell main member BC1. When the cell main member BC1 includes a plurality of outer wall surfaces, the two electrode terminals BC2 may be arranged on one of the outer wall surfaces, or individually arranged on the different outer wall surfaces.

The battery module BM is an array in which a plurality of battery cells BC each including the positive and the negative electrode terminals BC2 are arrayed in one direction. In the battery module BM, the individual battery cells BC are arrayed in a state in which one electrode terminal BC2 is arrayed in a line with the other electrode terminal BC2 in each of the battery cells BC. Thus, in the battery module BM, electrode terminal groups each formed of a plurality of electrode terminals BC2 arranged in a line are provided in respective two places, as illustrated in FIG. 2 (electrode terminal groups BC5 and BC6). Specifically, the battery module BM includes two lines of electrode terminal groups in each of which a plurality of electrode terminals BC2 are arranged in series (electrode terminal groups BC5 and BC6). In the following explanation, when the term "array direction" is used without any special reference, the term indicates the array direction of the battery cells BC and/or the array direction of the electrode terminals BC2 in each of the electrode terminal groups BC5 and BC6.

For example, in the battery cells BC according to the present embodiment, each of the cell main members BC1 forms a rectangular parallelepiped. For this reason, the battery module BM according to the present embodiment has a virtual rectangular parallelepiped shape with the battery cells BC, and includes six wall surfaces of an assembly formed of the battery cells BC. In addition, each of the battery cells BC according to the present embodiment includes two electrode terminals BC2 on one outer wall surface of the cell main member BC1 thereof (FIG. 2 and FIG. 4 to FIG. 6). For this reason, in the battery module BM according to the present embodiment, one of the six wall surfaces forming a rectangular parallelepiped shape is provided with two electrode terminal groups BC5 and BC6. For example, the battery module BM is mounted on the vehicle such that each of the electrode terminals BC2 is oriented upward in the vehicle.

The conductive module 1 is mounted on the battery module BM configured as described above and is electrically connected with each of the battery cells BC. The conductive module 1 includes a plurality of conductive interterminal connection components 10 (FIG. 1 to FIG. 6) each electrically connecting the adjacent electrode terminals BC2 of the battery module BM. In the conductive module 1, a plurality of sets of the interterminal connection components 10 are provided on each of the electrode terminal groups BC5 and BC6. Specifically, the conductive module 1 includes one interterminal connection component group (hereinafter also referred to as "first interterminal connection component group", if necessary) 15 formed of a plurality of interterminal connection components 10 each electrically connecting the adjacent electrode terminals BC2 of one electrode terminal group (hereinafter also referred to as "first electrode terminal group", if necessary) BC5, and the other interterminal connection component group (hereinafter also referred to as "second interterminal connection component group", if necessary) 16 formed of a plurality of interterminal connection components 10 each electrically connecting the adjacent electrode terminals BC2 of the other electrode terminal group (hereinafter also referred to as "second electrode terminal group", if necessary) BC6.

Figure 1:
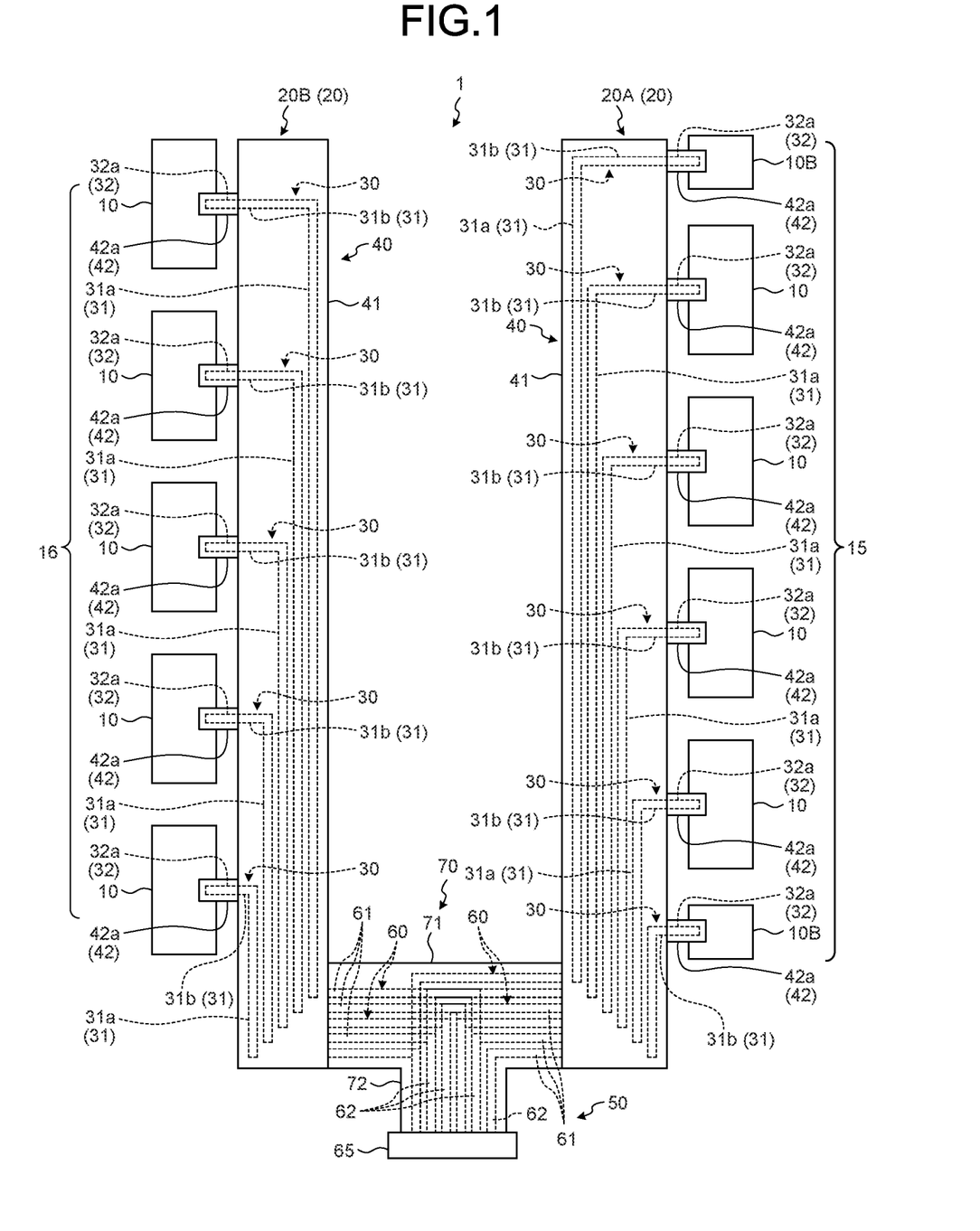
FIG. 1 is a plan view illustrating a conductive module in a temporary mounted form according to an embodiment.

Each of or one of the electrode terminal groups BC5 and BC6 includes an electrode terminal BC2 serving as a general positive electrode and an electrode terminal BC2 serving as a general negative electrode. The conductive module 1 is provided with a general positive electrode terminal connection component 10B and a general negative electrode terminal connection component 10B to be electrically connected with the respective electrode terminals BC2 serving as the general positive electrode and the general negative electrode (FIG. 1 to FIG. 3). In the conductive module 1 illustrated herein, the two terminal connection components 10B are provided in the first interterminal connection component group 15.

Each of the interterminal connection components 10 and the terminal connection components 10B illustrated herein is a plate-shaped bus bar and formed of a conductive material, such as a metal plate. The interterminal connection components 10 and the terminal connection components 10B may be electrically connected directly with the electrode terminals BC2, or electrically connected indirectly with the electrode terminals BC2. For example, in the case of adopting the plate-shaped or rectangular-parallelepiped-shaped electrode terminals BC2, the flat surfaces of the electrode terminals BC2 and the interterminal connection components 10 (or the terminal connection components 10B) are arranged to be mutually opposed, and electrically connected directly by welding (such as laser welding) the interterminal connection components 10 (or the terminal connection components 10B) to the electrode terminals BC2. In this case, each of the interterminal connection components 10 is welded to the two electrode terminals BC2 adjacent to each other in the array direction. In addition, when each of the electrode terminals BC2 is an electrode column, the electrode column itself includes a male screw portion and each of the interterminal connection components 10 and the terminal connection components 10B is provided with a through hole through which the electrode terminal BC2 is inserted. With this structure, the interterminal connection components 10 (or the terminal connection components 10B) are fastened on the electrode terminals BC2 by engaging the female screw member with the male screw portion of the electrode terminal BC2 inserted through the through hole. In this case, each of the interterminal connection components 10 is provided with two through holes corresponding to the two electrode terminals BC2 adjacent in the array direction. The interterminal connection components 10 are fastened on the two electrode terminals BC2 by inserting the two electrode terminals BC2 through the respective through holes and engaging the female screw members with the respective male screw portions of the electrode terminals BC2. Each of the interterminal connection components 10 and the terminal connection components 10B illustrated herein is formed in a rectangular flat shape, and welded to the electrode terminal BC2.

In addition, the conductive module 1 includes flexible wiring components 20 provided for the respective interterminal connection component groups 15 and 16 (FIG. 1 to FIG. 6). Each of the flexible wiring components 20 is electrically connected with the interterminal connection components 10 of the interterminal connection component group 15 (16) serving as the connection target. Specifically, the conductive module 1 includes one flexible wiring component (hereinafter also referred to as "first flexible wiring component", if necessary) 20A to be electrically connected with the interterminal connection components 10 of the first interterminal connection component group 15, and the other flexible wiring component (hereinafter also referred to as "second flexible wiring component", if necessary) 20B to be electrically connected with the interterminal connection components 10 of the second interterminal connection component group 16.

The first flexible wiring component 20A is configured as a component interposed between the first interterminal connection component group 15 and the electrical connection target (not illustrated) of the battery cells BC and electrically connect the interterminal connection components 10 of the first interterminal connection component group 15 with the electrical connection target (FIG. 1). By contrast, the second flexible wiring component 20B is configured as a component interposed between the second interterminal connection component group 16 and the electrical connection target and electrically connect the interterminal connection components 10 of the second interterminal connection component group 16 with the electrical connection target (FIG. 1). Examples of the electrical connection target include a battery monitoring unit to monitor the battery state (such as the voltage, the current, and the temperature) of each of the battery cell BC.

Each of the flexible wiring components 20 (the first flexible wiring component 20A and the second flexible wiring component 20B) includes a plurality of voltage detection lines 30 arranged in parallel. Each of the voltage detection lines 30 has flexibility and measures the interterminal potential between the electrode terminals BC2. The voltage detection lines 30 are provided on the respective interterminal connection components 10 of the interterminal connection component group 15 (16) serving as the connection target, and electrically connect the respective interterminal connection components 10 with the electrical connection target. In each of the flexible wiring components 20, the voltage detection lines 30 are arranged in a state of being mutually separated from each other. In addition, each of the flexible wiring components 20 includes an insulating member 40 having flexibility and containing all the voltage detection lines 30 thereof (FIG. 1). When the conductive module 1 includes an electrode terminal group BC5 as its constituent element, the first flexible wiring component 20A may connect the voltage detection lines 30 also with respective terminal connection components 10B of the electrode terminal group BC5 and cover subsidiary conductive portions 32 of the voltage detection lines 30 described later with subsidiary insulating portions 42 of the insulating member 40 described later.

Each of the flexible wiring components 20 (the first flexible wiring component 20A and the second flexible wiring component 20B) illustrated herein is a flexible printed circuit board (FPC), the voltage detection lines 30 are formed of a conductor pattern, and the insulating member 40 is formed of a film of various types. For example, each of the flexible wiring components 20 (the first flexible wiring component 20A and the second flexible wiring component 20B) may be formed as a single-sided flexible printed circuit board including a conductor pattern layer in which the voltage detection lines 30 are formed, or as a double-sided flexible printed circuit board including two conductor pattern layers in which the voltage detection lines 30 are formed. A structure other than a flexible printed circuit board may be used as the flexible wiring component 20, as long as the structure has flexibility (elasticity) and includes a flat main part and transforming portions 21 as follows. For example, examples of the flexible wiring components 20 include a printed circuit member, such as a membrane wiring board, a flat cable (FC), and a flexible flat cable (FFC).

Figure 4:
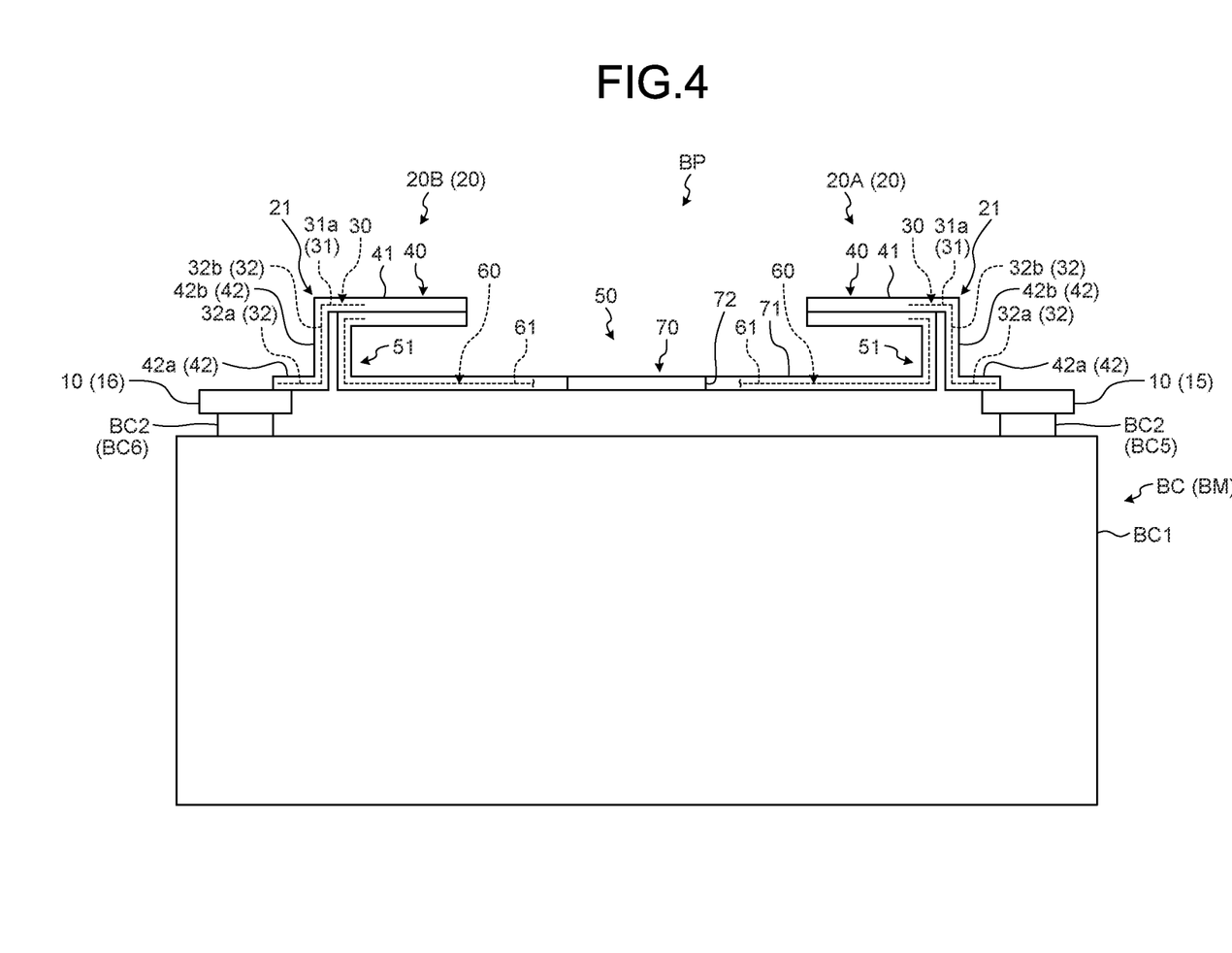
FIG. 4 is a diagram illustrating the conductive module of FIG. 2 together with the battery module, with a main part magnified in a direction of an arrow A.

Each of the voltage detection lines 30 includes a main conductive portion 31 and a subsidiary conductive portion 32 (FIG. 1). The main conductive portion 31 includes an extending portion 31a extending in the array direction and electrically connected at one end with the electrical connection target, and a extending portion 31a extending from the other end of the extending portion 31a in a crossing direction with respect to the array direction. The subsidiary conductive portion 32 extends from one end of the crossing portion 31b in the extending direction of the crossing portion 31b, and electrically connects the end with the interterminal connection component 10 serving as the connection target. The subsidiary conductive portion 32 includes an electrical connecting portion 32a physically and electrically connected at one end with the interterminal connection component 10 serving as the connection target, and a coupling portion 32b coupling the other end of the electrical connecting portion 32a with one end of the crossing portion 31b (FIG. 4).

In each of the voltage detection lines 30 illustrated herein, one end portion thereof serves as one end of the extending portion 31a in the main conductive portion 31, and electrically connects one end of the extending portion 31a indirectly with the electrical connection target as follows. In each of the flexible wiring components 20 (the first flexible wiring component 20A and the second flexible wiring component 20B), one end of the extending portion 31a in each of the main conductive portions 31 is disposed in one end portion (the end portion on the side on which the electrical connection target is disposed in the present example) in the array direction. The extending portions 31a of the main conductive portions 31 have different lengths for the interterminal connection components 10 serving as the connection targets of the voltage detection lines 30, and the extending portion 31a having the interterminal connection component 10 disposed closer to one end portion of the flexible wiring component 20 on one side in the array direction as the connection target has a shorter length.

In each of the flexible wiring components 20 (the first flexible wiring component 20A and the second flexible wiring component 20B) illustrated herein, the extending portions 31a of all the main conductive portions 31 are arranged one by one at intervals therebetween in an opposed arrangement direction in which the electrode terminal groups BC5 and BC6 are arranged to be mutually opposed. In the following explanation, the term "opposed arrangement direction" used without any special reference indicates the opposed arrangement direction in which the electrode terminal groups BC5 and BC6 are arranged to be mutually opposed, the opposed arrangement direction in which the interterminal connection component groups 15 and 16 are arranged to be mutually opposed, or the opposed arrangement direction in which the flexible wiring components 20 are arranged to be mutually opposed.

In each of the flexible wiring components 20 (the first flexible wiring component 20A and the second flexible wiring component 20B) illustrated herein, the crossing portions 31b of all the main conductive portions 31 are arranged one by one at intervals therebetween in the array direction. All the individual crossing portions 31b illustrated herein are extended in the same direction orthogonal to the array direction. The individual crossing portions 31b in the present example are extended in the opposed arrangement direction. In each of the flexible wiring components 20 (the first flexible wiring component 20A and the second flexible wiring component 20B), pairs each including the crossing portion 31b and the subsidiary conductive portion 32 are arranged one by one at intervals in the array direction.

In each of the voltage detection lines 30 illustrated herein, the other end of the electrical connecting portion 32a in the subsidiary conductive portion 32 serves as the other end portion thereof, and the other end of the electrical connecting portion 32a is electrically connected directly with the interterminal connection component 10 serving as the connection target thereof. For example, the other end of the electrical connecting portion 32a is soldered to the interterminal connection component 10 serving as the connection target. However, the voltage detection lines 30 may electrically connect the other end of the electrical connecting portion 32a indirectly with the interterminal connection component 10 serving as the connection target, with another conductive member (such as an electrical wire and a terminal metal fitting) interposed therebetween.

The voltage detection lines 30 in the present example offsets the main conductive portion 31 and the electrical connecting portion 32a of the subsidiary conductive portion 32 in a direction orthogonal to the array direction and the opposed arrangement direction and in the opposed arrangement direction, regardless of the temporary mounted form or the formal mounted form. In each of the subsidiary conductive portions 32 in the present example, the coupling portion 32b described above is interposed between one end of the crossing portion 31b in the main conductive portion 31 and the other end of the electrical connecting portion 32a (FIG. 4). Each of the coupling portions 32b is extended in a direction orthogonal to the array direction and the opposed arrangement direction and toward the battery cell BC side. In addition, each of the electrical connecting portions 32a illustrated herein is extended in the opposed arrangement direction.

Each of the insulating members 40 is formed in a flat shape and with a size capable of covering at least part of the interterminal connection component group 15 (16) serving as the connection target of the flexible wiring component 20 together with the electrode terminals BC2 in the formal mounted form, and includes a main insulating portion 41 containing the main conductive portions 31 of all the voltage detection lines 30 serving as the containing target, and subsidiary insulating portions 42 provided on the respective subsidiary conductive portions 32 of all the voltage detection lines 30 serving as the containing target and containing the subsidiary conductive portions 32 (FIG. 1 and FIG. 2).

The main conductive portions 31 and the insulating portion (main insulating portion 41) covering them in each of the flexible wiring components 20 are formed in a size capable of covering at least part of the interterminal connection component group 15 (16) serving as the connection target together with the electrode terminals BC2 in the formal mounted form. Accordingly, each of the main insulating portions 41 is formed in a flat shape and in such a size. Each of the main insulating portions 41 in the present example is formed in a rectangular flat shape. In addition, each of the main insulating portions 41 described herein contains the main conductive portions 31 of all the voltage detection lines 30 serving as the containing target in a state in which one ends of the extending portions 31a in the main conductive portions 31 can be physically and electrically connected with one ends of coupling conductive portions 61 described later. For example, each of the main insulating portions 41 is formed to expose one ends of the respective extending portions 31a to the outside.

In addition, the subsidiary insulating portions 42 illustrated herein contain the respective subsidiary conductive portions 32 in a state in which one ends of the electrical connecting portions 32a in the subsidiary conductive portions 32 can be physically and electrically connected with the interterminal connection components 10 serving as the connection target. For example, each of the subsidiary insulating portions 42 is formed to expose one end of the electrical connecting portion 32a to the outside. When another conductive member (such as an electrical wire and a terminal metal fitting) is interposed between one end of the electrical connecting portion 32a and the interterminal connection component 10 serving as the connection target, the subsidiary insulating portion 42 exposes one end of the electrical connecting portion 32a to the outside to physically and electrically connect one end of the electrical connecting portion 32a to the conductive member.

Each of the subsidiary insulating portions 42 in the present example includes a first insulating portion 42a containing the electrical connecting portion 32a, and a second insulating portion 42b containing the coupling portion 32b (FIG. 4).

Figure 5:
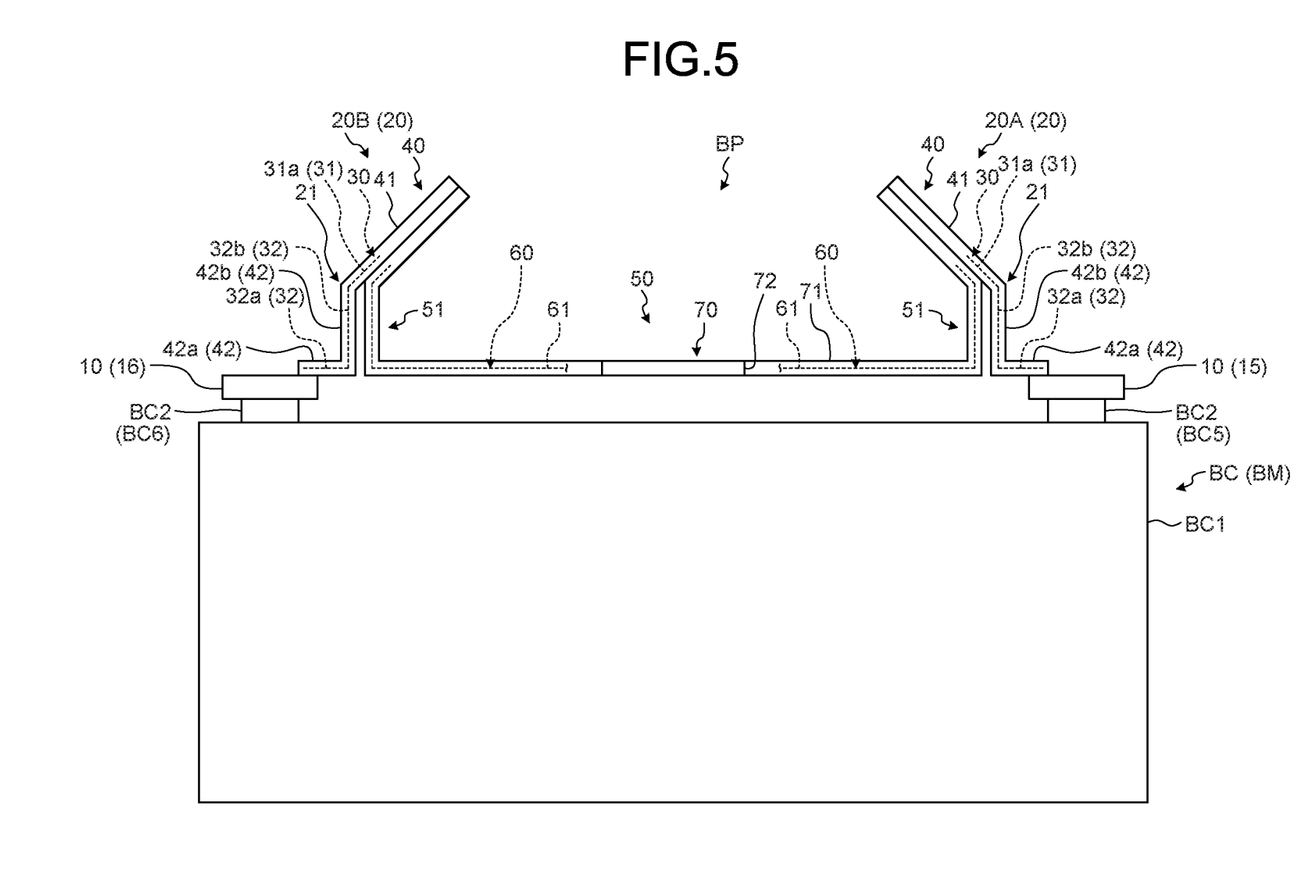
FIG. 5 is a sectional view illustrating a shape of the conductive module during transformation.
Figure 6:
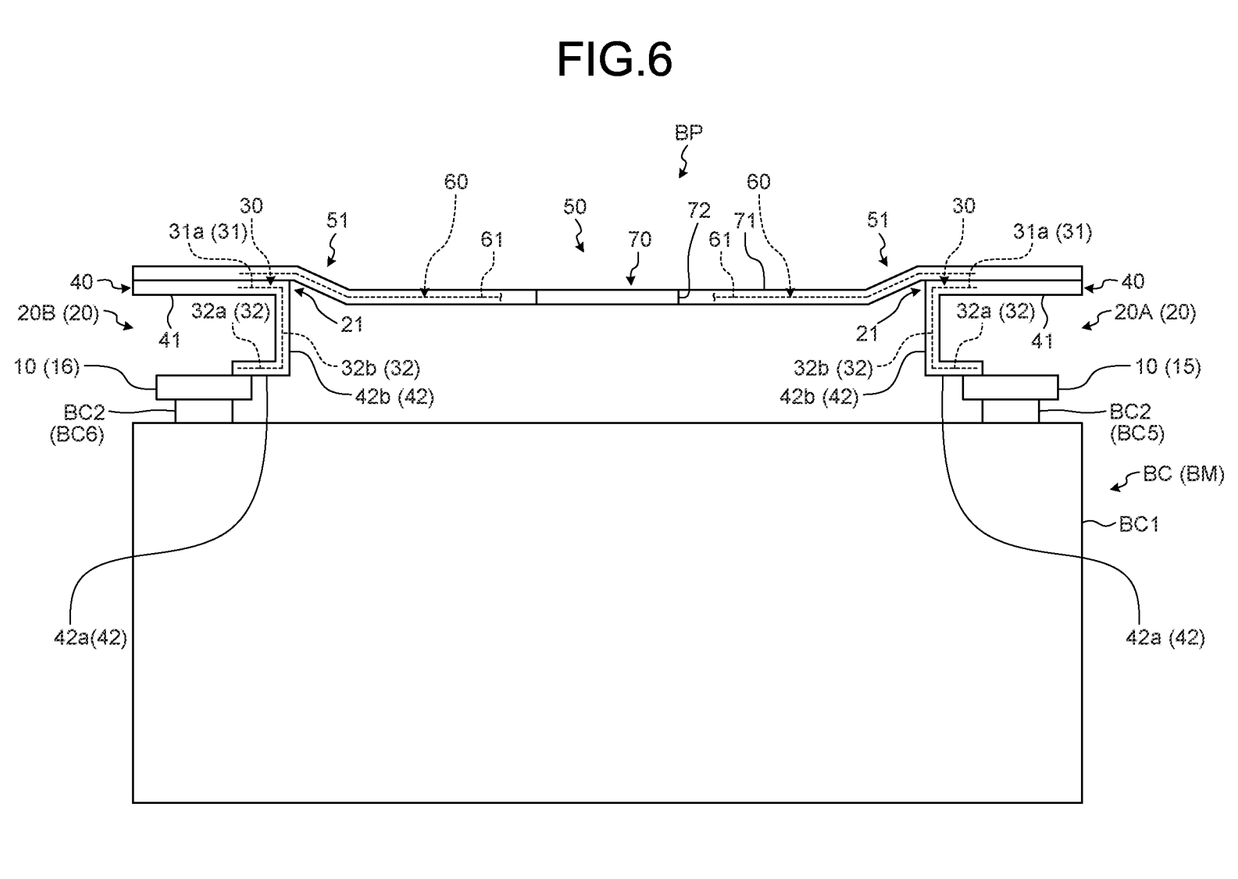
FIG. 6 is a diagram illustrating the conductive module of FIG. 3 together with the battery module, with a main part magnified in the direction of the arrow A.

When the flexible wiring components 20 (the first flexible wiring component 20A and the second flexible wiring component 20B) each including the voltage detection lines 30 and the insulating member 40 as described above are mounted on the battery module BM, first, the flexible wiring component 20 are set in the temporary mounted form enabling a connection work to physically and electrically connect the interterminal connection components 10 (the interterminal connection components 10 and the terminal connection components 10B with respect to the first flexible wiring component 20A in the present example) coupled via the voltage detection lines 30 with the electrode terminals BC2. After the connection work is finished, the flexible wiring components 20 (the first flexible wiring component 20A and the second flexible wiring component 20B) are transformed into the formal mounted form. For this reason, each of the flexible wiring components 20 (the first flexible wiring component 20A and the second flexible wiring component 20B) includes transforming portions 21 enabling transformation into the temporary mounted form (FIG. 1, FIG. 2, and FIG. 4) at the time when the interterminal connection components 10 of the interterminal connection component group 15 (16) serving as the connection target are physically and electrically connected with the electrode terminals BC2 and the formal mounted state (FIG. 3 and FIG. 6) after the connection work (FIG. 4 to FIG. 6).

Each of the transforming portions 21 is provided on part (that is, one end side of the crossing portions 31b) of the crossing portion 31b on the subsidiary conductive portion 32 side and/or the subsidiary conductive portion 32. Each of the transforming portions 21 is formed as a portion displacing a portion between the main conductive portion 31 side and the subsidiary conductive portion 32 side between the temporary mounted form and the formal mounted form, by transforming part of the crossing portion 31b on the subsidiary conductive portion 32 side (that is, on one end side of the crossing portion 31b) and/or the subsidiary conductive portion 32. Specifically, each of the transforming portions 21 is provided in an end portion of the main insulating portion 41 on the subsidiary insulating portion 42 side and/or the subsidiary insulating portion 42. When each of the transforming portions 21 is provided on the subsidiary conductive portion 32 and the subsidiary insulating portion 42 covering the subsidiary conductive portion 32, for example, the coupling portion 32b and the whole second insulating portion 42b covering the coupling portion 32b may be used as the transforming portion 21, or the coupling portion 32b and part of the second insulating portion 42b covering the coupling portion 32b on the main conductive portion 31 side (the main insulating portion 41 side) may be used as the transforming portion 21. In the present example, each of the transforming portions 21 is used as a boundary portion between an end portion of a combination of the main conductive portion 31 and the main insulating portion 41 on the subsidiary conductive portion 32 side and the subsidiary insulating portion 42 side and an end portion of a combination of the coupling portion 32b and the second insulating portion 42b on the main conductive portion 31 side and the main insulating portion 41 side.

Each of the transforming portions 21 illustrated herein is a bending transformation portion transforming the flexible wiring component 20 (the first flexible wiring component 20A and the second flexible wiring component 20B) into the temporary mounted form and the formal mounted form by bending transformation.

Specifically, the flexible wiring components 20 (the first flexible wiring component 20A and the second flexible wiring component 20B) in the temporary mounted form are set to the form enabling physical and electrical connection of all the interterminal connection components 10 of the interterminal connection component group 15 (16) serving as the connection target with the electrode terminals BC2 (FIG. 2 and FIG. 4). For this reason, each of the main insulating portions 41 containing the main conductive portions 31 of the voltage detection lines 30 is set adjacent to the interterminal connection component group 15 (16) serving as the connection target of the voltage detection lines 30 in the opposed arrangement direction, in the temporary mounted form accompanied by transformation of the transforming portions 21. The main insulating portions 41 in the present example are disposed between the interterminal connection component groups 15 and 16 and adjacent to the interterminal connection component group 15 (16) serving as the connection target of the flexible wiring component 20, in the temporary mounted form accompanied by transformation of the transforming portions 21.

In the flexible wiring components 20 (the first flexible wiring component 20A and the second flexible wiring component 20B), the transforming portions 21 are transformed from the temporary mounted form into the formal mounted form (FIG. 5). In this manner, when the module is changed to the formal mounted form (FIG. 3 and FIG. 6), each of combinations of the main conductive portions 31 and the main insulating portions 41 is displaced to a position in which the flexible wiring component 20 covers all the interterminal connection components 10, the terminal connection components 10B, and the electrode terminals BC2 in the interterminal connection component group 15 (16) serving as the connection target with an interval.

The conductive module 1 according to the present embodiment includes a coupling flexible wiring component 50 interposed between one ends of the extending portions 31a in the two flexible wiring components 20 (the first flexible wiring component 20A and the second flexible wiring component 20B) and the electrical connection target, and electrically connecting the two flexible wiring components 20 with the electrical connection target (FIG. 1 to FIG. 6).

The coupling flexible wiring component 50 includes coupling voltage detection lines 60 for the respective main conductive portions 31, and a coupling insulating member 70 (FIG. 1). The coupling voltage detection lines have flexibility and electrically connect one ends of the extending portions 31a with the electrical connection target. The coupling insulating member 70 has flexibility and contains all the coupling voltage detection lines 60. In the coupling flexible wiring component 50, the individual coupling voltage detection lines 60 are arranged at intervals therebetween. Each of the coupling voltage detection lines 60 illustrated herein is formed in an L shape. For example, the individual coupling voltage detection lines 60 are arranged at intervals therebetween in a plane direction of a plane extending along the array direction and the opposed arrangement direction.

The coupling flexible wiring component 50 is a flexible printed circuit board (FPC), and has a structure in which the coupling voltage detection lines 60 are formed with a conductor pattern, and the coupling insulating member 70 is formed with a film of various types. For example, the coupling flexible wiring component 50 may be formed as a single-sided flexible printed circuit board including a conductor pattern layer in which the coupling voltage detection lines 60 are formed, or as a double-sided flexible printed circuit board including two conductor pattern layers in which the coupling voltage detection lines 60 are formed. In the same manner as the flexible wiring components 20 described above, a structure other than a flexible printed circuit board may be used as the coupling flexible wiring component 50, as long as the structure has flexibility (elasticity) and a flat shape and includes following transforming portions 51 as follows.

The coupling voltage detection lines 60 includes first coupling conductive portions 61 extending in the opposed arrangement direction in the formal mounted form and physically and electrically connected at one ends with respective one ends of the extending portions 31a, and second coupling conductive portions 62 extending in the array direction from the other ends of the first coupling conductive portions 61 and electrically connected at one ends with the electrical connection target (FIG. 1). In each of the coupling voltage detection lines 60, one end portion thereof serves as one end of the first coupling conductive portion 61, and the other end portion thereof serves as one end of the second coupling conductive portion 62.

The first coupling conductive portions 61 on the first flexible wiring component 20A side extend from the second flexible wiring component 20B side toward the first flexible wiring component 20A side in the formal mounted form, and the extended one ends thereof are physically and electrically connected with respective one ends of the extending portions 31a in the first flexible wiring component 20A. By contrast, the first coupling conductive portions 61 on the second flexible wiring components 20B side extend from the first flexible wiring component 20A side toward the second flexible wiring component 20B side in the formal mounted form, and the extended one ends thereof are physically and electrically connected with respective one ends of the extending portions 31a in the second flexible wiring component 20B.

In the coupling flexible wiring component 50, one ends of the first coupling conductive portions 61 on the first flexible wiring component 20A side are arranged in an end portion (end portion on the first flexible wiring component 20A side) on one side in the opposed arrangement direction, and one ends of the first coupling conductive portions 61 on the second flexible wiring component 20B side are arranged in an end portion (end portion on the second flexible wiring component 20B side) on the other side in the opposed arrangement direction.

One ends of the first coupling conductive portions 61 are arranged to be aligned with positions of one ends of the extending portions 31a in the respective main conductive portions 31 of the flexible wiring components 20 (the first flexible wiring component 20A and the second flexible wiring component 20B) serving as the connection target. One end of the extending portion 31a and one end of the first coupling conductive portion 61 forming a pair are electrically connected directly by, for example, soldering or anisotropic conductive film (ACF) pressure joining. When the conductor is exposed in the connecting portion, exposure of the conductor is prevented by, for example, covering the connecting portion with an insulating member.

By contrast, in the coupling voltage detection lines 60, one ends of the second coupling conductive portions 62 are electrically connected directly or indirectly with the electrical connection target. In the coupling flexible wiring component 50, one ends of the second coupling conductive portions 62 of the coupling voltage detection lines 60 are arranged in an end portion on the electrical connection target side in the array direction. In the conductive module 1 illustrated herein, a connector 65 is connected with one ends of the second coupling conductive portions 62 (FIG. 1 to FIG. 3), and one ends of the second coupling conductive portions 62 are electrically connected with the electrical connection target via the connector 65.

The coupling insulating member 70 includes a first coupling insulating portion 71 and a second coupling insulating portion 72 (FIG. 1 to FIG. 3). The first coupling insulating portion 71 has a flat shape in the formal mounted form, and contains all the first coupling conductive portions 61 on the first flexible wiring component 20A side and the second flexible wiring component 20B side. The second coupling insulating portion 72 has a flat shape in the formal mounted form, and contains portions projecting from the first coupling insulating portion 71 in all the second coupling conductive portions 62 on the first flexible wiring component 20A side and the second flexible wiring component 20B side.

The first coupling insulating portion 71 contains all the first coupling conductive portions 61, in a state of enabling all the first coupling conductive portions 61 to physically and electrically connect one ends of the first coupling conductive portions 61 with the extending portions 31a in the main conductive portions 31 of the flexible wiring components 20 (the first flexible wiring component 20A and the second flexible wiring component 20B) serving as the connection target. For example, the first coupling insulating portion 71 is formed to expose one ends of the first coupling conductive portions 61 to the outside.

In addition, the second coupling insulating portion 72 contains all the second coupling conductive portions 62 in a state of enabling physical and electrical connection of one ends of all the second coupling conductive portions 62 on the first flexible wiring component 20A side and the second flexible wiring component 20B side with the connector 65. For example, the second coupling insulating portion 72 is formed to expose one ends of all the second coupling conductive portions 62 to the outside.

The coupling flexible wiring component 50 is transformed in cooperation with transformation of the flexible wiring components 20 (the first flexible wiring component 20A and the second flexible wiring component 20B) between the temporary mounted form and the formal mounted form. For this reason, the coupling flexible wiring component 50 includes following transforming portions 51 for the respective flexible wiring components 20 (the first flexible wiring component 20A and the second flexible wiring component 20B) (FIG. 4 to FIG. 6). The following transforming portions 51 enable following transformation when the flexible wiring components 20 are transformed between the temporary mounted form and the formal mounted form.

The following transforming portion 51 is provided for the first coupling conductive portions 61 and the coupling insulating portion (first coupling insulating portion 71) covering the first coupling conductive portions 61. The following transforming portions 51 are bending transformation portions transforming the flexible wiring components 20 between the temporary mounted form and the formal mounted form by bending transformation. In the coupling flexible wiring component 50, the following transforming portions 51 are provided for the first coupling conductive portions 61 and the first coupling insulating portions 71 on the flexible wiring component 20 sides (the first flexible wiring component 20A side and the second flexible wiring component 20B side) beyond the second coupling insulating portion 72 in the opposed arrangement direction. In the coupling flexible wiring component 50 illustrated herein, part or the whole of the first coupling conductive portions 61 and the first coupling insulating portion 71 located on the flexible wiring component 20 sides beyond the second coupling insulating portion 72 in the opposed arrangement direction is used as the following transforming portions 51. In the present example, the whole portions thereof on the respective flexible wiring component 20 sides (the first flexible wiring component 20A side and the second flexible wiring component 20B side) are used as the following transforming portions 51.

The conductive module 1 is provided with a first insulating holding member holding all the interterminal connection components 10 in the electrode terminal group BC5, a second insulating holding member holding all the interterminal connection components 10 in the electrode terminal group BC6, a third insulating holding member holding the first flexible wiring component 20A, and a fourth insulating holding member holding the second flexible wiring component 20B, although they are not illustrated. For example, the first holding member and the third holding member are formed as one unitary piece capable of maintaining the first flexible wiring component 20A in the temporary mounted form and capable of relatively moving the first flexible wiring component 20A between them, and holds the first flexible wiring component 20A in the formal mounted form with a lock mechanism provided between them. The second holding member and the fourth holding member are formed in the same manner as the first holding member and the third holding member, and hold the second flexible wiring component 20B in each of the temporary mounted form and the formal mounted form.

In the conductive module 1 according to the present embodiment, as the number of battery cells BC in one battery module BM increases, the number of circuits between each of the battery cells BC and the electrical connection target increases. For this reason, in the conductive module 1, the circuit density with the second coupling conductive portions 62 increases in the second coupling insulating portion 72 of the coupling flexible wiring component 50, as the number of battery cells BC in one battery module BM increases.

For this reason, in the conductive module 1 according to the present embodiment, when the number of circuits is equal to or smaller than a predetermined number, all the flexible wiring components 20 (the first flexible wiring component 20A and the second flexible wiring component 20B) and the coupling flexible wiring component 50 should be formed as single-sided flexible printed circuit boards. This structure enables reduction in cost.

In addition, in the conductive module 1 according to the present embodiment, when the number of circuits exceeds the predetermined number, the coupling flexible wiring component 50 should be formed as a double-sided flexible printed circuit board, while each of the flexible wiring components 20 (the first flexible wiring component 20A and the second flexible wiring component 20B) is formed as single-sided flexible printed circuit boards. In addition, in the coupling flexible wiring component 50, the circuits (the second coupling conductive portions 62) of the coupling voltage detection lines 60 to be connected with the electrical connection target should be alternately distributed, at the second coupling insulating portion 72, to one conductor pattern layer side and the other conductor pattern layer side. Specifically, the coupling flexible wiring component 50 should be provided with an insulating layer to alternately distributing the circuits to one conductor pattern layer side and the other conductor pattern layer side. For example, in the coupling flexible wiring component 50, the circuits of the coupling voltage detection lines 60 to be connected with the electrical connection target are alternately distributed, at the second coupling insulating portion 72, to one conductor pattern layer side and the other conductor pattern layer side, in accordance with the ascending order of the voltage sensed with the electrical connection target (battery monitoring unit) via the coupling voltage detection lines 60. The circuits of the coupling voltage detection lines 60 are alternately distributed to one conductor pattern layer side and the other conductor pattern layer side from one end side to the other end side along the opposed arrangement direction, for example, in accordance with the ascending order of the voltage. In addition, the circuits of the coupling voltage detection lines 60 are arranged, for example, such that the circuits of one group of the coupling voltage detection lines 60 are arranged on one conductor pattern layer side from one end side to the other end side along the opposed arrangement direction in accordance with the ascending order of the voltage, and the circuits of the other group of the coupling voltage detection lines 60 are arranged on the other conductor pattern layer side from the other end side to one end side along the opposed arrangement direction in accordance with the ascending order of the voltage.

In the explanation described above, the interterminal connection component groups 15 and 16 (the interterminal connection components 10 and the terminal connection components 10B) each serve as one of the constituent elements of the conductive module 1. However, in the battery pack BP, there are cases where the interterminal connection components 10 and the terminal connection components 10B are mounted on the battery module BM in advance, and the conductive module 1 may be mounted on such a battery module BM. For this reason, the conductive module 1 according to the present embodiment does not necessarily include the interterminal connection component groups 15 and 16 (the interterminal connection components 10 and the terminal connection components 10B) each as one of the constituent elements thereof. However, in this case, the conductive module 1 is provided with transforming portions 21 as elements enabling transformation into the temporary mounted form (temporary mounted form at the time of electrically connecting the voltage detection lines 30 with the interterminal connection components 10 and the terminal connection components 10B of the interterminal connection component group 15 (16) serving as the connection target as described above) and the formal mounted form after the connection work.

In the conductive module 1 according to the present embodiment described above, when the flexible wiring components 20 (the first flexible wiring component 20A and the second flexible wiring component 20B) are changed to the formal mounted form, the flexible wiring components 20 are arranged in a state of being superimposed on the respective electrode terminal groups BC5 and BC6, on the battery module BM. As described above, the conductive module 1 achieves miniaturization enabling reduction in occupying an area on the battery module BM.

With miniaturization in such a form, the conductive module 1 secures a space between the electrode terminal groups BC5 and BC6 on the battery module BM. With this structure, the conductive module 1 enables effective use of the space on the battery module BM, such as arrangement of another component (such as a component to fix the battery cells BC, a component to radiate heat of the battery cells BC, and a safety related component) in the secured space on the battery module BM.

In addition, the conductive module 1 according to the present embodiment has a structure in which the flexible wiring components 20 in the formal mounted form cover the respective electrode terminal groups BC5 and BC6, as described above. With this structure, in the conductive module 1, by forming the main insulating portions 41 as elements covering the whole part of all the interterminal connection components 10 in the respective electrode terminal groups BC5 and BC6, the main insulating portions 41 containing the main conductive portions 31 can be used as insulating covers for the interterminal connection components 10 of the respective electrode terminal groups BC5 and BC6.

In addition, the conductive module 1 according to the present embodiment has a structure in which the main conductive portions 31 and the main insulating portions 41 containing the main conductive portions 31 can be bent in the array direction, and the main conductive portions 31 and the main insulating portions 41 can be bent in an orthogonal direction orthogonal to the array direction and the opposed arrangement direction, in each of the flexible wiring components 20 (the first flexible wiring component 20A and the second flexible wiring component 20B). In addition, in each of the flexible wiring component 20 (the first flexible wiring component 20A and the second flexible wiring component 20B), a combination of the subsidiary conductive portion 32 and the subsidiary insulating portion 42 can be relatively moved in the array direction with respect to a combination of the main conductive portion 31 and the main insulating portion 41. With this structure, the conductive module 1 is capable of absorbing positional variation of each of the battery cells BC in the array direction and positional variation of each of the battery cells BC in the orthogonal direction orthogonal to the array direction and the opposed arrangement direction by bending and relative movement, and improving mount workability for the battery module BM.

In addition, the conductive module 1 is capable of relatively moving a combination of the electrical connecting portion 32a and the first insulating portion 42a with respect to a combination of the main conductive portion 31 and the main insulating portion 41 in the opposed arrangement direction, by transformation, such as bending of the coupling portion 32b and the second insulating portion 42b containing the coupling portion 32b, in the formal mounted form of the flexible wiring components 20 (the first flexible wiring component 20A and the second flexible wiring component 20B). With this structure, the conductive module 1 is capable of absorbing positional variation of each of the battery cells BC in the opposed arrangement direction by relative movement of a combination of the electrical connecting portion 32a and the first insulating portion 42a in the formal mounted form, and improving mount workability for the battery module BM.

In addition, the conductive module 1 is capable of bending a combination of the first coupling conductive portions 61 and the first coupling insulating portion 71 in the opposed arrangement direction, and bending the combination in the orthogonal direction orthogonal to the array direction and the opposed arrangement direction. With this structure, the conductive module 1 is capable of absorbing positional variation between the flexible wiring components 20 (the first flexible wiring component 20A and the second flexible wiring component 20B) caused by mounting on the battery module BM, and improving mount workability for the battery module BM.

In addition, the conductive module 1 is capable of bending a combination of the second coupling conductive portions 62 and the second coupling insulating portion 72 in the array direction, and bending the combination in the orthogonal direction orthogonal to the array direction and the opposed arrangement direction. With this structure, the conductive module 1 is capable of absorbing positional variation between the battery module BM and the electrical connection target by the bending, and improving mount workability for the battery module BM.

In the conductive module according to the present embodiment, when the flexible wiring components are changed to the formal mounted form, the flexible wiring components are arranged in a state of being superimposed on the respective electrode terminal groups on the battery module. As described above, the conductive module achieves miniaturization enabling reduction in occupying area on the battery module.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A conductive module comprising:
    interterminal connection component groups attached to a battery module and each provided with a plurality of interterminal connection components, the battery module being an array of a plurality of battery cells each including a positive electrode terminal and a negative electrode terminal, the battery module including two lines of electrode terminal groups in each of which the electrode terminals are arranged in series, the interterminal connection components being provided for each of the electrode terminal groups and electrically connecting the electrode terminals; and
    a flexible wiring component provided for each of the two interterminal connection component groups, and including a plurality of voltage detection lines arranged in parallel and measuring an interterminal potential between the electrode terminals, wherein
    the flexible wiring component includes a transforming portion enabling transformation into a temporary mounted form and a formal mounted form, the temporary mounted form is used when each of the interterminal connection components serving as a connection target is physically and electrically connected with the electrode terminals, and the formal mounted form is used after work of the connecting,
    each of the voltage detection lines includes a main conductive portion and a subsidiary conductive portion, the main conductive portion includes an extending portion extending in an array direction of the battery cells and electrically connected at one end with an electrical connection target and a crossing portion extending from the other end of the extending portion in a crossing direction crossing the array direction, the subsidiary conductive portion extends from one end of the crossing portion and extends in the crossing direction and is electrically connected at one end with the interterminal connection component serving as the connection target,
    the main conductive portions and an insulating portion covering the main conductive portions in the flexible wiring component overlap at least part of a corresponding one of the interterminal connection component groups serving as the connection target together with the electrode terminals in the formal mounted form,
    the transforming portion is provided in part of the crossing portion on the subsidiary conductive portion side and/or in the subsidiary conductive portion, and displacing a portion between a main conductive portion side and the subsidiary conductive portion side between the temporary mounted form and the formal mounted form by the transformation,
    the electrode terminal groups are spaced away from each other in an opposed arrangement direction that is different from the array direction, and
    the subsidiary conductive portion spaces the main conductive portion away from the interterminal connection components in a direction that is orthogonal to the array direction and the opposed arrangement direction.

2. The conductive module according to claim 1, wherein the transforming portion is a bending transforming portion transforming the flexible wiring component into the temporary mounted form and the formal mounted form by bending transformation.

3. The conductive module according to claim 2, wherein the flexible wiring component is a flexible printed circuit board.

4. The conductive module according to claim 2, further comprising:
    a coupling flexible wiring component interposed between the one ends of the extending portions in the two flexible wiring components and the electrical connection target, and electrically connecting the two flexible wiring components with the electrical connection target, wherein
    the coupling flexible wiring component includes coupling voltage detection lines provided for the respective main conductive portions and electrically connecting the one ends of the extending portions with the electrical connection target, and a coupling insulating member containing all the coupling voltage detection lines, and includes following transforming portions provided for the respective flexible wiring components and enabling transformation when the flexible wiring components are transformed between the temporary mounted form and the formal mounted form.

5. The conductive module according to claim 1, wherein the flexible wiring component is a flexible printed circuit board.

6. The conductive module according to claim 5, further comprising:
    a coupling flexible wiring component interposed between the one ends of the extending portions in the two flexible wiring components and the electrical connection target, and electrically connecting the two flexible wiring components with the electrical connection target, wherein the coupling flexible wiring component includes coupling voltage detection lines provided for the respective main conductive portions and electrically connecting the one ends of the extending portions with the electrical connection target, and a coupling insulating member containing all the coupling voltage detection lines, and includes following transforming portions provided for the respective flexible wiring components and enabling transformation when the flexible wiring components are transformed between the temporary mounted form and the formal mounted form.

7. The conductive module according to claim 1, further comprising:
a coupling flexible wiring component interposed between the one ends of the extending portions in the two flexible wiring components and the electrical connection target, and electrically connecting the two flexible wiring components with the electrical connection target, wherein
the coupling flexible wiring component includes coupling voltage detection lines provided for the respective main conductive portions and electrically connecting the one ends of the extending portions with the electrical connection target, and a coupling insulating member containing all the coupling voltage detection lines, and includes following transforming portions provided for the respective flexible wiring components and enabling transformation when the flexible wiring components are transformed between the temporary mounted form and the formal mounted form.

8. The conductive module according to claim 7, wherein
each of the coupling voltage detection lines includes a first coupling conductive portion and a second coupling conductive portion, the first coupling conductive portion extends in the opposed arrangement direction of the flexible wiring components in the formal mounted form and physically and electrically connected at one end with the corresponding one end of the extending portion, the second coupling conductive portion extends from the other end of the first coupling conductive portion in the array direction and electrically connected at one end with the electrical connection target, and
each of the following transforming portions is provided for the first coupling conductive portions and a coupling insulating portion of the coupling insulating member covering the first coupling conductive portions.

9. The conductive module according to claim 8, wherein
the electrical connection target is a battery monitoring unit monitoring a battery state of each of the battery cells, and
the coupling flexible wiring component is a double-sided flexible printed circuit board including two conductor pattern layers in each of which the coupling voltage detection lines are formed, and includes an insulating layer in which circuits of the coupling voltage detection lines connected with the battery monitoring unit are alternately distributed into one conductor pattern layer side and the other conductor pattern layer side.

10. A conductive module for a battery module, the battery module including a plurality of battery cells and a plurality of interterminal connection components, each of the battery cells including a positive electrode terminal and a negative electrode terminal, and the interterminal connection components being electrically and physically connected to the electrode terminals, the conductive module comprising:
a flexible wiring component including a plurality of voltage detection lines, the voltage detection lines being arranged in parallel and configured to measure an interterminal potential between the electrode terminals, wherein
the flexible wiring component includes a transforming portion enabling transformation into a temporary mounted form and a formal mounted form, the temporary mounted form is used when each of the interterminal connection components serving as a connection target is physically and electrically connected with the electrode terminals, the formal mounted form is used after work of the connecting,
each of the voltage detection lines includes a main conductive portion and a subsidiary conductive portion, the main conductive portion includes an extending portion extending in an array direction of the battery cells and configure to be electrically connected at one end with an electrical connection target and a crossing portion extending from the other end of the extending portion in a crossing direction crossing the array direction, the subsidiary conductive portion includes an electrical connecting portion and a coupling portion, the coupling portion extends from one end of the crossing portion and is connected to each of the electrical connecting portion and one end of the crossing portion, the electrical connecting portion extends in the crossing direction and is configured to be electrically connected at one end with a respective one of the interterminal connection components serving as the connection target,
the main conductive portions and an insulating portion covering the main conductive portions in the flexible wiring component are formed in a size configured to cover at least part of a corresponding one of the interterminal connection component groups serving as the connection target together with the electrode terminals when the conductive module is connected to the battery module in the formal mounted form,
the transforming portion is provided in part of the crossing portion on a subsidiary conductive portion side and/or in the subsidiary conductive portion, and displacing a portion between a main conductive portion side and the subsidiary conductive portion side between the temporary mounted form and the formal mounted form by the transformation, and
the coupling portion spaces the main conductive portion away from the electrical connection portion in a direction that is orthogonal to the array direction and the crossing direction.

11. The conductive module according to claim 10, wherein
the transforming portion is a bending transforming portion transforming the flexible wiring component into the temporary mounted form and the formal mounted form by bending transformation.

12. The conductive module according to claim 10, wherein
the flexible wiring component is a flexible printed circuit board.

13. The conductive module according to claim 10, further comprising:
a coupling flexible wiring component interposed between the one ends of the extending portions in the two flexible wiring components and the electrical connection target, and configured to electrically connect the two flexible wiring components with the electrical connection target, wherein the coupling flexible wiring component includes coupling voltage detection lines provided for the respective main conductive portions and configured to electrically connect the one ends of the extending portions with the electrical connection target, and a coupling insulating member containing all the coupling voltage detection lines, and includes following transforming portions provided for the respective flexible wiring components and enabling transformation when the flexible wiring components are transformed between the temporary mounted form and the formal mounted form.

\* \* \* \* \*